Nov. 3, 1970  J. G. MOORE ET AL  3,537,860
PREPARATION OF DRIED WHEY
Filed Sept. 22, 1967  5 Sheets-Sheet 2

Fig. 2.

INVENTORS
James G. Moore
Edward B. Pinkel
BY
Popp and Sommer
ATTORNEYS

Fig. 6.

United States Patent Office 3,537,860
Patented Nov. 3, 1970

3,537,860
PREPARATION OF DRIED WHEY
James G. Moore, Williamsville, and Edward B. Pinkel, Buffalo, N.Y., assignors to Blaw-Knox Company, Pittsburgh, Pa., a corporation of Delaware
Filed Sept. 22, 1967, Ser. No. 669,877
Int. Cl. A23c 21/00
U.S. Cl. 99—57  4 Claims

ABSTRACT OF THE DISCLOSURE

Whey is dried by heating under vacuum to preconcentrate without crystallization of the lactose in the hydroscopic beta anhydride form followed by cooling to crystallize lactose in the nonhygroscopic alpha hydrate form. The steps of concentrating and cooling to crystallize are repeated. Thereafter, the recooled whey is centrifuged and the resulting filtrate and filter cake are introduced into a drying zone. A partially dried portion of the solid material is removed from an intermediate portion of the drying zone and combined with the filtrate and filter cake being introduced into the drying zone.

---

While applicable to drying various wheys, the invention is especially directed to drying acid or cottage cheese whey which constitutes almost half of the whey produced and which has posed a special problem to dry, by large scale, continuous operation, without additives of pH modification, into a stable, commercially nonhygroscopic, non-gritty, granular, and preferably whole whey product suitable for human consumption. The lactose, which in a typical cottage cheese whey composition on a dry basis constitutes 64–67%, presents the principal difficulty, the balance, on a dry basis, being about 12.5% protein, principally lactalbumin, 0.5% fat, and 11.5% ash, principally inorganic minerals.

To obtain a stable or commercially nonhygroscopic, nongritty, granular product, the lactalbumins can first be coagulated by a predetermined and controlled temperature and time treatment. Such precoagulation step can be omitted, however, if the subsequent concentration is carried out below the coagulation temperature (140° F.) of the lactalbumins, up to the time they are removed, as by dissolving them.

Following this the whey is preconcentrated at controlled low temperatures to inhibit production of the hygroscopic beta anhydride crystals, initial concentration of the raw whey being under vacuum and below the critical temperature of 200° F., above which the formation of only beta anhydride crystals occurs.

Thereafter the concentrate is cooled under agitation to the temperature necessary to crystallize the lactose essentially in the form of the alpha hydrate.

The crystallization step is followed by further concentration, with or without centrifuging out of the coagulated lactalbumins and crystallized lactose, which in one form requires additional cooling and stirring to promote crystal growth for such centrifuging.

The last stage of processing involves hot air drying with a concurrently moving stream of heated air, followed by cooling, grinding, screening and bagging.

The feature of the invention involves withdrawing a part of the whey after or so being air dried (at least 50% by weight of the feed of fresh material to the air dryer), and recycling it to an earlier stage of the process, such recycling involving the use of a blender to blend the earlier stage components and the air dried whey into a condition suitable for reentry into the air dryer.

In the accompanying drawings.

FIGS. 1–4

In the form of the invention shown in FIGS. 1–4, as well as with the other forms illustrated, the raw whey from a feed line 9, for economy, is first heated in a first preheater or heat exchanger 10 by the vapors from a subsequent triple effect evaporator as hereinafter described, the condensate being removed at 11.

Figure 1:
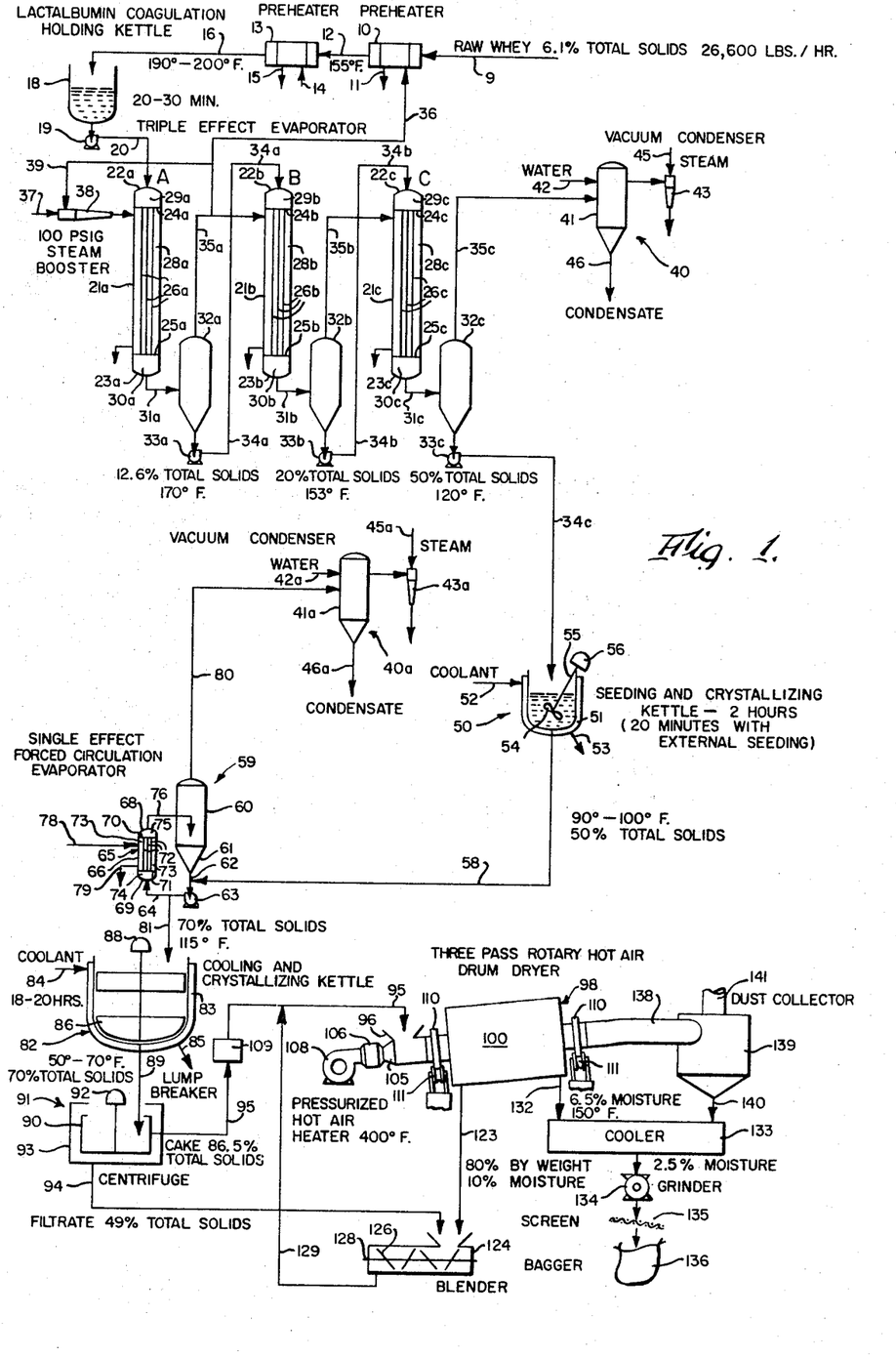
FIG. 1 is a flow sheet illustrating one form of the practice of the present invention.
Figure 2:
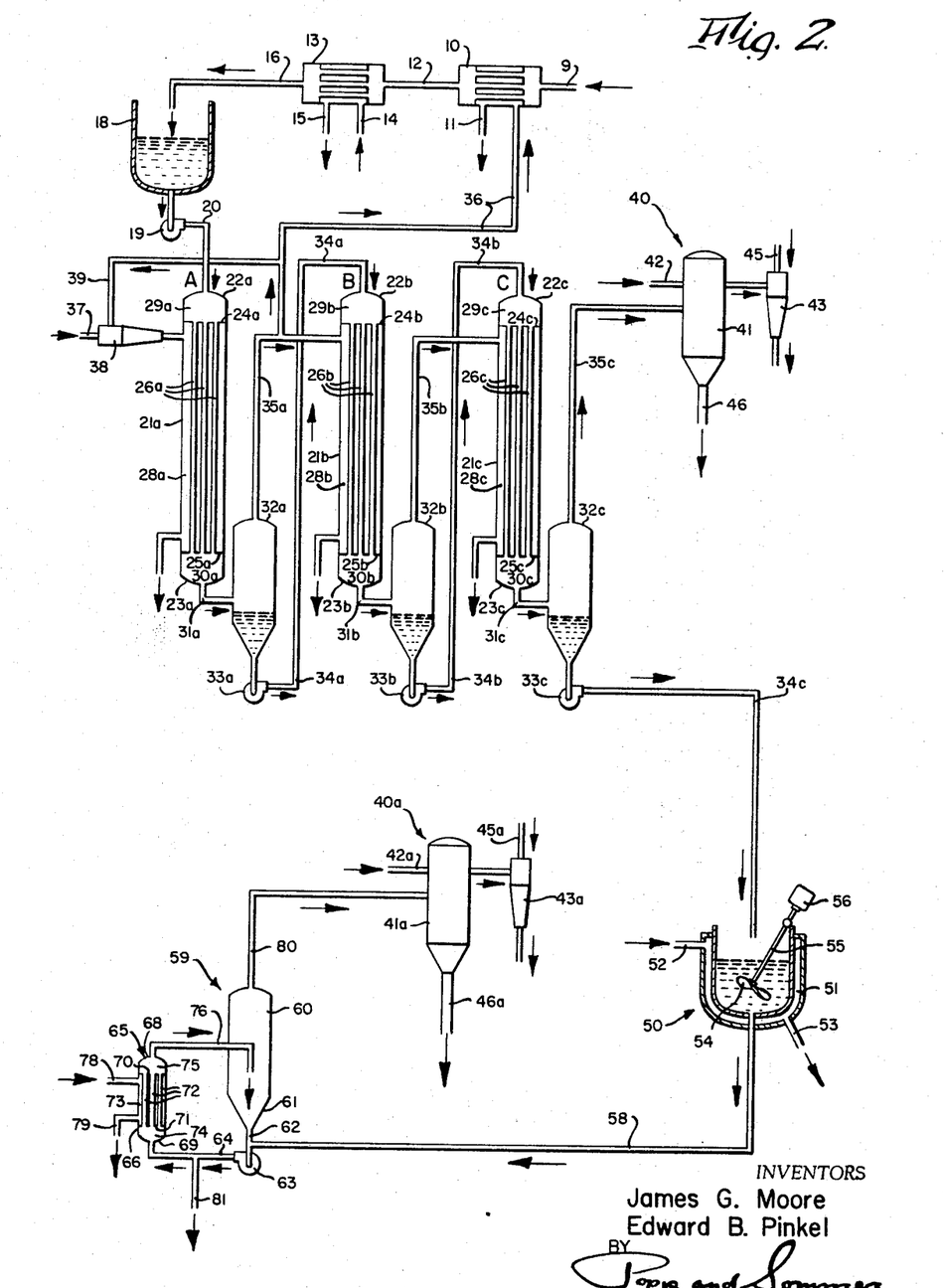
FIG. 2 is a more detailed diagrammatic representation of a part of the intial preconcentrating and crystallizing apparatus of FIG. 1.

The next processing of the preheated whey involves further preheating and holding to coagulate the lactalbumins. For this the preheated raw whey passes via line 12 to a second preheater or heat exchanger 13, in which it is heated by steam from a steam line 14, the condensate being removed at 15. The preheated raw whey then passes via line 16 to a holding tank 18 where the whey is held for a sufficient length of time so that coagulation of the protein or lactalbumins takes place.

The next processing involves concentration of the whey at a temperature below 200° F. so that beta crystals cannot form in the evaporator. To this end, from the holding tank 18, the raw preheated whey with its protein content coagulated is pumped by a pump 19 and line 20 to a vacuum evaporator. The size and type of the vacuum evaporator used is selected in accordance with the amount of whey to be dried. Thus, a single batch vacuum evaporator (not shown) could be used for small operations but the apparatus illustrated in FIGS. 1–4 is designed to handle a continuous supply of a large quantity of whey per hour and hence a triple effect recompression downflow single pass vacuum evaporator is shown, although obviously any suitable type could be used depending on the operational economies. Thus, from the holding tank 18 the raw preheated whey with its protein content coagulated is pumped by the pump 19 and line 20 to the first effect A of this triple effect evaporator, the other two effects of which are designated at B and C.

Each of the effects A, B, and C can be of any usual and well known construction and can be of the natural circulation type or can be of the recompression type as shown. The steam chests and vapor separators or flash chambers of the several effects are similar in construction, and hence a description of one will be deemed to apply to all, the similar parts of the several effects being distinguished by the subscripts a, b and c, respectively.

Thus the first effect A comprises an upright cylindrical steam chest shell 21a having upper and lower end heads 22a and 23a. Upper and lower tube sheets 24a and 25a are connected by a bundle of conventional downflow tubes 26a to form a steam or vapor space 28a surrounding these tubes. The preheated raw whey, with its protein content coagulated, from line 20 is introduced into the space 29a above the upper tube sheet 24a, and flows down the tubes 26a into the chamber 30a from which it flows out through a line 31a into a vapor separator or flash chamber 32a. The liquid collects as a body in the bottom of this flash chamber and is pumped out by a pump 33a through a line 34a.

The vapor from the flash chamber 32a passes via a line 35a into the vapor space 28b of the steam chest shell 21b of the second effect B and a branch line 36 supplies a part of this vapor to the first preheater 10.

Steam under pressure from a supply line 37 supplies a steam booster 38 which discharges into the steam space 28a of the first effect A and also has its suction line 39 connecting via the branch line 36 with the vapor line 35a which conducts vapor from the vapor separator 32a of the first effect A into the vapor space 28b of the second effect B.

The vapor from the vapor separator 32b of this second effect B is conducted by the line 35b to the vapor space 28c of the steam chest shell 21c of the third effect C.

The vapor from the vapor separator 32c of this third effect C is conducted by the line 35c to a conventional vacuum condenser indicated generally at 40. This condenser can be of the contact or surface type is shown comprising a condensing chamber 41 supplied with spray water from a water supply pipe 42, a vacuum or subatmospheric pressure being maintained in the condensing chamber 41 by a stage steam jet ejector 43, supplied with steam from a steam line 45. The cooling water and condensate is discharged from the condensing chamber 40 at 46.

The preconcentrated whey from the triple effect evaporator is removed by the pump 33c from the bottom of the third effect vapor separator 32c and discharged via line 34c into a jacketed seeding and crystallizing kettle 50. A coolant is introduced into the jacket space 51 from a coolant inlet 52 and removed therefrom by coolant outlet 53. The whey in this jacketed seeding and crystalling kettle 50 is preferably continuously agitated, as by a propeller 54 on a propeller shaft 55 driven by a motor 56, or by a slow moving sweep or paddle type agitator. The holding time in this seeding and crystalling kettle 50 is such as to permit the formation of lactose crystals principally in the form of the alpha hydrate. However, this holding time can be very materially reduced by adding alpha lactose seed crystals to the concentrated whey so cooling and crystallizing in this kettle.

From the seeding and crystallizing kettle 50, the whey flows via line 58 to a forced circulation single effect vacuum evaporator indicated generally at 59. This evaporator comprises an upright cylindrical vapor separator shell 60 having a conical bottom 61 discharging into a pump inlet or suction line 62 into which the feed line 58 from the seeding and crystallizing kettle 50 also discharges. The pump 63 for this suction line 62 discharges via a line 64 into the bottom of a steam heater 65. This steam heater is in the form of an upright cylindrical steam chest shell 66 having upper and lower end heads 68 and 69. Upper and lower tube sheets 70 and 71 are connected by a bundle of conventional upflow tubes 72 and form a steam or vapor space 73 surrounding these tubes. The whey from the pump discharge line 64 enters the space 74 below the lower tube sheet 71 and flows up through the tubes 72 into the space 75 above the upper tube sheet 70 from which it is sprayed via line 76 back into the vapor separator shell 60. The steam heater 65 is supplied with steam from 78 and the condensate is relieved therefrom at 79.

As with the triple effect evaporator A, B, C, the vapor from the single effect evaporator 59 is conducted by a line 80 a conventional vacuum condenser 40a. This condenser can be identical in form to the vacuum condenser 40 and hence the same reference numerals, distinguished by the subscript a have been employed for similar parts, and their description will not be repeated.

A part of the whey being recirculated through the forced circulation evaporator 59 by the pump 63 is discharged via the line 81 into a jacketed cooling and crystallizing kettle 82. A coolant is introduced into the jacket space 83 of this kettle from an inlet 84 and discharged therefrom through an outlet 85. The whey in this cooling and crystallizing kettle is continuously agitated by a paddle 86 driven by a motor 88.

Figure 3:
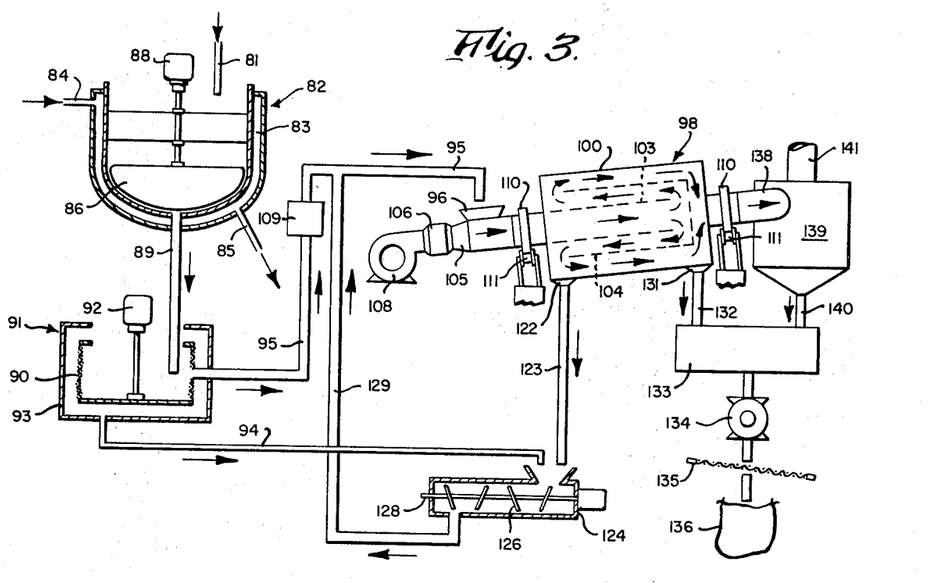
FIG. 3 is a more detailed diagrammatic representation of the remaining apparatus of FIG. 1, particularly of the centrifuge, multiple pass rotary drum dryer and recycling means.

The whey is held for a substantial length of time in this cooling and crystallizing kettle 82 and leaves as a slurry of crystallized lactose, coagulated lactalbumins and liquid concentrate of the inorganic minerals and uncrystallized lactose. This slurry flows through a line 89 to the rotating bowl 90 of an automated batch type of centrifuge 91. This bowl is rotated by a motor 92, the filtrate being discharged centrifugally into the stationary body 93 of the centrifuge and flowing out through line 94. The filter cake held back by the bowl flows out through a line 95 into the inlet hopper 96 of a hot air, rotary drum dryer 98.

Figure 4:
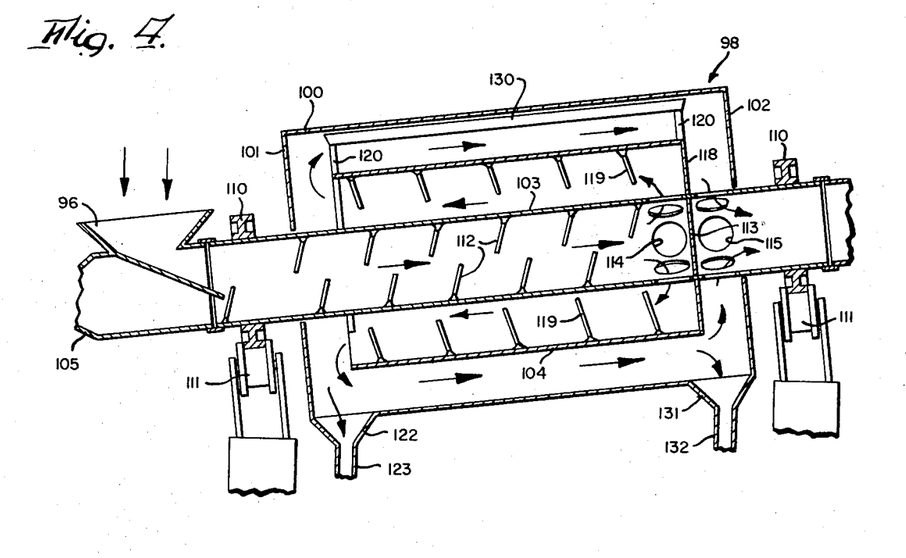
FIG. 4 is a simplified vertical longitudinal section through the three-stage rotary drum air dryer employed.

Although any type of revolving hot air rotary dryer could be used, the dryer 98 is shown as being a triple pass dryer of the type shown in the Vincent Pat. 2,705,842 dated Apr. 12, 1955 to which deference is made for a more detailed description, the present showing being essentially diagrammatic. As herein shown, the dryer 98 comprises a cylindrical stationary shell 100 with its axis extending horizontally but which can be slanted with reference to the horizontal, as shown, to induce flow of the solidified whey pieces toward its low end. This stationary outer shell has end heads 101, 102 with coaxial openings, and rotatable coaxially within the stationary casing 100 are a pair of concentric connected imperforate drums, namely, an inner rotary drum 103 having end portions extending through the end walls 101 and 102, and an outer rotary drum 104 connected to rotate therewith, and arranged wholly within the stationary shell 100.

The lower end of the inner drum 103 is supplied with hot air, at such moderate pressure as is required to discharge the product from the dryer, from the coaxial stationary hot air outlet 105 to a furance 106 supplied with air for such hot air discharge, by a blower 108.

The filter cake from the centrifuge outlet line 95 is passed through a lump breaker 109 and then discharged through the inlet chute or hopper 96 in the stationary hot air outlet 105 into the lower inlet end of the inner rotary drum 103.

Externally of the stationary shell 100, a ring or band 110 is fixed to each end of the inner rotary drum 103, and each of these rings is cradled between a pair of supporting rollers 111 suitably mounted to permit rotation of the inner rotary drum 103 by any suitable drive means (not shown). The inner drum 103 preferably has internal paddles 112 which not only agitate the filter cake so fed to the lower end of the inner rotary drum 103 but also shift it axially toward an end head 113 which closes off the upper end of the inner rotary drum 103 and which is arranged a substantial distance inwardly from the stationary end head 102 for a purpose which will presently appear.

On opposite sides of this inner rotary drum end head 113, the inner rotary drum 103 is provided with two annular series of large openings 114 and 115. The openings 114 are arranged on the side of the inner drum end head 113 facing the hot air heater 106 and the filter cake introduced into the inlet or lower end of the inner rotary drum 103 moves toward these openings 114, to fall therethrough, by the internal paddles 112. The material so falling through the inner rotary drum holes 114, as well as the concurrent hot air under moderate pressure from the hot air heater 106, enters the corresponding end of the imperforate outer rotary drum 104 which end is also closed off by an imperforate end head 118 so that both the partly dried material and the hot air are constrained to move in the opposite direction axially along the interior of outer rotary drum 104. This movement of the material can be controlled by inclined internal conveyer paddles 119. This outer rotary drum 104 can be tied to the inner rotary drum 103 in any suitable manner, as by the outer drum end head 118 at one end and by radial arms 120 at the other end.

At the opposite open end of the outer rotary drum 104, the material drops into the corresponding end of the stationary cylindrical shell 100. An important feature of the invention is that before the final pass through this stationary shell 100 of the three pass dryer 98, a part of the partly dried material in process is withdrawn from the dryer, as by means of a hopper 122, and returned via a line 123 to a blender 124. This blender is shown as being in the form of a mixing trough containing mixing paddles 126 mounted on a rotary shaft 128. This blender also receives the filtrate from the centrifuge 91 via line 94 and the solid, partly dried material so withdrawn from the dryer 98 before the final pass therethrough is blended with this filtrate and returned via a line 129 to its line 95 which feeds the filter cake to the three pass dryer 98.

In the final pass through the dryer 98, along the bottom of the stationary shell 100, the material is moved by the hot air under moderate pressure from the hot air heater 106 toward the end of the shell 100 opposite from its outlet hopper 122, and during such movement it is agitated by an annular series of sweep bars 130 which are arranged to sweep close to the interior of the stationary outer shell 100 and can be mounted on outward projections of the end head 118 of the outer rotary shell 104 and of its radial arms 120.

The heavier pieces of the material traveling axially along the bottom of the outer stationary shell 100 are swept by the sweeps 130 into a hopper or receiver 131 in the bottom of this shell at the outlet end thereof and are thence conducted via a line 132 to a cooler 133. From this cooler the material is conducted to a grinder 134, screen 135 and bagger 136. The light particles traveling axially along the stationary shell 100 travel between the end heads 102 and 118 and through the holes 115 into the open end of the inner rotary drum 103 beyond the internal head 113. From this open end the fly material enters the inlet 138 of a dust collector 139, from which the dried material is returned via a line 140 to the cooler 133, the exhaust gas escaping at 141.

OPERATION FIGS. 1–4

As an example of the operation of the form shown in FIGS. 1–4, it will be assumed that 26,600 pounds per hour of raw cottage cheese whey having a total solids content of 6.1% is to be converted, without additives or pH modification, into a dry granular product suitable for human consumption and containing all of the original protein, lactose and mineral components the product being nongritty and nonhygroscopic and hence with the lactose predominately in the form of the alpha hydrate.

This raw cottage cheese whey is supplied from the feed line 9, to the first preheater 10 where, purely for operational economy, its temperature is raised by a part of the vapors from the first effect A of the triple effect evaporator to a temperature of, say, 155° F. The so preheated whey is then passed via line 12 through the second preheater 13 where its temperature is raised, through steam supplied to this second preheater, to form about 190°–200° F. At this temperature it is held, by recirculation, in the holding kettle 18 for from about 20–30 minutes to coagulate the lactalbumins, such coagulation being important to avoid subsequent coagulation thereof on the surfaces of the concentrator or other parts of the apparatus. After such coagulation, the whey from the coagulating holding kettle 18 is pumped by the pump 19 to the space 29a above the top tube sheet 24a of the first effect A of the multiple effect evaporator.

In flowing down through the tubes 26a of this first effect A, it is subjected to the heat of the steam surrounding these tubes and supplied from the steam inlet 37 and upon discharge of the whey from the lower chamber 30a into the vapor separator or flash chamber 32a evaporation takes place so as to concentrate the whey to about 12.6% total solids, the leaving temperature being about 170° F.

As previously indicated, for economy in operation, a part of the vapor generated in this first vapor separator 32a is employed to initially preheat the feed in the preheater 10. Another part is used as the source of heat for the second effect B and a third part is shown as returned to the steam booster 38 for the first effect A. The preconcentrated whey from the flash chamber 32a, together with its coagulated lactalbumin content, is withdrawn by the pump 33a at its temperature of about 170° F. and so precencentrated to about 12.6% total solids and is fed to the space 29b above the tube sheet 24b of the second effect B. On flowing down the tubes 26b it is subjected to the heat of the vapors surrounding these tubes and on being discharged from the bottom chamber 30b into the vapor separator 32b it flashes to produce a concentrate of about 20% total solids, the leaving temperature being about 153° F.

The vapor produced in this flash chamber 32b serves to heat the third effect C and the precencentrated whey from the flash chamber 32b, together with its coagulated lactalbumin content, is withdrawn by the pump 33b and discharged into the chamber 29c above the top tube sheet 24c of the third effect C. On flowing down the tubes 26c of this third effect C it is subjected to the heat of the vapors surrounding these tubes and on being discharged from the bottom chamber 30c into the vapor separator 32c it flashes to produce a concentrate at a temperature of about 120° F. and having about 50% total solids, this flash chamber 32c being maintained under vacuum by the vacuum condenser 40.

The whey so preconcentrated to about 50% total solids and at a temperature of about 120° F., together with its lactalbumin content fully coagulated, is transferred by the pump 33c into the seeding and crystallizing kettle 50 where it is slowly agitated or kept in motion by the motor driven propeller 54 and is cooled to from about 90° to about 100° F. Without external seeding the whey is held in this seeding and crystallizing kettle 50 approximately two hours. Crystallization of the lactose in the form of the alpha hydrate is initiated, crystallization in the form of the beta anhydride being inhibited because of the low temperature, namely, 90°–100° F. maintained in this seeding and crystallizing kettle 50.

The holding time in the seeding and crystallizing kettle 50 can be very materially reduced if alpha hydrate seed crystals are added to the kettle instead of relying on self-seeding as immediately above described. With such external seeding, the holding time in the kettle 50, with the same cooling to from about 90° to about 100° F. can be reduced to about 20 minutes.

Any crystallization in the triple effect evaporator, A, B, C in the form of the beta anhydride is inhibited due to maintaining all temperature in this triple effect evaporator and in the preheaters in advance of this triple effect evaporator below the critical temperature of 200° F. Below this critical temperature lactose crystallizes essentially in the form of nonhygroscopic alpha hydrate, limited only by the physical equilibrium factors, whereas above this critical temperature crystallization is in the form of the hygroscopic beta anhydride.

The whey with its lactalbumin content coagulated and with its lactose in part in the form of alpha hydrate crystals flows from the seeding and crystallizing kettle 50 to the forced circulation single effect vacuum evaporator 59. The steam heater 65 of this single effect evaporator raises the temperature of the whey to approximately 115° F. and upon being discharged at this temperature into the vapor separator 60 it flashes to produce a concentrate of about 70% total solids, a vacuum being maintained in this flash chamber 60 by the vacuum condenser 40a.

The recirculation pump 63 for the forced circulation single effect evaporator 59 discharges a part of its output at this temperature of 115° F. and with about 70% total solids into the cooling and crystallizing kettle 82 where the whey is maintained in motion by the motor driven paddle 86. In this cooling and crystallizing kettle the whey is cooled from about 115° F. to about 50° to about 70° F. by a coolant introduced into its jacket space 83 and it is maintained in this cooling and crystallizing kettle for from 18–20 hours so that the lactose continues its crystallization, particularly in crystal size growth, in the form of the alpha hydrate due to the low temperature and length of the time to which it is subjected in this cooling and crystallizing kettle 82.

From this cooling and crystallizing kettle 82 the whey with its lactalbumin content coagulated with the preponderance of its lactose in crystals of such size to permit their removal by centrifuging, is discharged into the rotating bowl 90 of the centrifuge 91. The filter cake from the bowl 90 having from about 77% to 86.5% total solids content or 13.5%–23% moisture, and representing a recovery of about 68% of the total solids in the whey fed to the centrifuge, is removed via line 95 and discharged through the lump breaker 109 into the inlet hopper 96 of the three pass rotary drum hot air dryer 98. This filter cake is moved along the central drum 103 of this dryer by the paddles 112 and is subjected to hot air supplied to flow concurrently with the filter cake from a hot air heater 106 under the moderate pressure induced by the fan 108. This hot air is supplied at a temperature of as high as 400° F., this temperature being rapidly reduced by reduction of the moisture content from 13.5–23% to 6.5% and never heating the filter cake being dried to the critical temperature of 200° F., above which the formation of the hygroscopic beta anhydride crystals is encouraged.

This hot air and drying filter cake leave this inner rotating drum 103 through the holes 114 at its dead end and enter the outer rotating drum 104 which is connected to rotate with the inner drum through the end head 118 and arms 120. The drying whey is propelled, as a second stage of drying, axially along this outer rotating drum 104 by the paddles 119 toward its open end where it falls into the bottom of the stationary cylindrical shell 100. At this point an important feature of the invention resides in the recycling of a substantial amount of the solid whey to an earlier stage of the process. The material so recycled escapes from the dryer 98 through the hopper 122 and line 123 and in amount is about 80% of the total weight of the fresh material fed to the dryer 98. Thus, the weight of the partly dried material withdrawn through line 123 for recycling is about 80% of the weight of the fresh material discharged from the centrifuge 91 via line 95 to the dryer 98.

The fully dried and lighter pieces of whey so falling into the stationary shell 100 become entrained in the air stream supplied under moderate pressure by the fan 108 of the air heater 106 and are carried to the outlet or high end of this stationary shell 100. The heavier material is turned over and kept in motion by the sweep bars 130 which move around in closely spaced relation to the inner periphery of this cylindrical stationary shell 100 and this heavier material is also propelled axially along the final pass or bottom of the stationary shell 100 by the concurrently moving air, being subjected to the final drying action of the propelling hot air and being discharged through the hopper 131 and outlet line 132 with about 6.5% moisture content and at a temperature of about 150° F., again well below the critical temperature of 200° F. above which the formation of hygroscopic beta anhydride crystals is encouraged. This discharge is into the cooler 133 in which the moisture content reduces to about 2½% and the dried whey is cooled to within 10% of the ambient wet bulb temperature.

At the discharge or lower end of this stationary cylindrical shell 110 the dust-like particles entrained in the air stream are carried by the air toward the center of the dryer and escape through the holes 115 to the blocked off end of the inner rotary drum 103 from which the heating air and entrained dust-like dried whey are discharged into the inlet 138 of a dust collector 139. The collected dust-like whey from this dust collector passes via the line 140 into the cooler 133 to joint the larger pieces of dried whey which escape through the hopper 131 and line 132. From this cooler the dried whey passes through the grinder 134 following which the product is screened at 135 and bagged at 136.

Reverting to the centrifuge 91, the filtrate collecting in the stationary body 93 of this centrifuge, which is bitter due to its inorganic content, escapes with about 49% total solids content via the line 94 and in the blender 124 is blended and mixed with the large proportion, namely, 80% by weight of incompletely dried whey from the three pass dryer 98 which escapes via the hopper 122 and line 123 just prior to the last pass through the bottom of the stationary shell 100 of this dryer. This mixture of filtrate and incompletely dried whey solids is transferred via the line 129 to the line 95 where it joins the filter cake from the centrifuge 91, the partially dried portion of this mixture so removed through the hopper 122 being recycled through the three pass dryer 98.

As previously indicated, by preconcentrating the whey in the triple effect evaporator A, B, C and in the single effect evaporator 59 at temperatures below 140° F., it is unnecessary to first coagulate the lactalbumins by the preheater 13 and coagulation holding kettle 18 and these last pieces of apparatus can be eliminated. With such an arrangement, the liquid containing the uncoagulated lactalbumins and the minerals can be removed at 94 following centrifuging in 91.

The product resulting from the practice of the invention as illustrated in FIGS. 1–4 is a non-gritty commercially nonhygroscopic, free flowing, fine granular product which is entirely suitable for human consumption and especially with acid or cottage cheese whey both the social and economic implications of the low cost production of whole dried whey in this form are obvious.

Thus, from a social point of view, in 1965 3.4 billion gallons of whey resulted from all cheese making operations in the United States of which 46% or 1.5 billion gallons was acid or cottage cheese whey which presents special problems in drying. While a very small part of the total whey has been used as a commercial source of lactose, as animal feed, as crop fertilizer and for human consumption; the largest portion, and practically all cottage cheese whey, is simply handled as useless waste, being run into streams or sewers or allowed to putrify in large dumping fields.

Such dumping into streams is particularly destructive. Because of its chemistry, the bacterial action that results in its decomposition involves extremely high biological oxygen demands, both from aerobic (bacteria requiring free oxygen—obligate aerobes) as well as anaerobic (bacteria which utilize chemically bound oxygen only—obligate anaerobes) standpoints. More simply, the bacterial reactions involved in the decomposition of whey deplete water of vast quantities of both molecular and chemically bound oxygen, making it unfit to sustain life of any sort. It is estimated that 100 lbs. (approximately 1 conventional 10 gallon milk can), when dumped into a stream or sewer places the same load on the active purifying elements that is imposed by the disposal of the raw wastes of 21 human beings for a period of 24 hours.

On the economic side, commercially nonhygroscopic non-gritty, dry granular whole whey is, of course, largely a sugar having the same formula as cane or other sugars and besides being valuable as an additive to animal feed, a rapidly expanding market is indicated for human consumption. Thus while only a limited amount of dry whey is being sold for human consumption at present, indications are that in a relatively short time the only limitation of the market will be production and cost and not demand. A high quality, stable, commercially nonhygroscopic dried whole whey can be employed in lieu of a part of dried skim milk in bakery products, as an ingredient for soups, candy, ice cream, process cheese mixtures, dietetic and diabetic preparations, instant potatoes, many meat products and directly in soft drinks, where the acid properties of the dried cottage cheese whey are desirable and minimize the need for unnatural acid additives.

Whey can be used to provide more attractively and uniformly browned baked goods and the use of dried sweet or acid whey can provide selectively desirable characteristics for specific effects in the baking as well as in the food industry as a whole.

Figure 5:
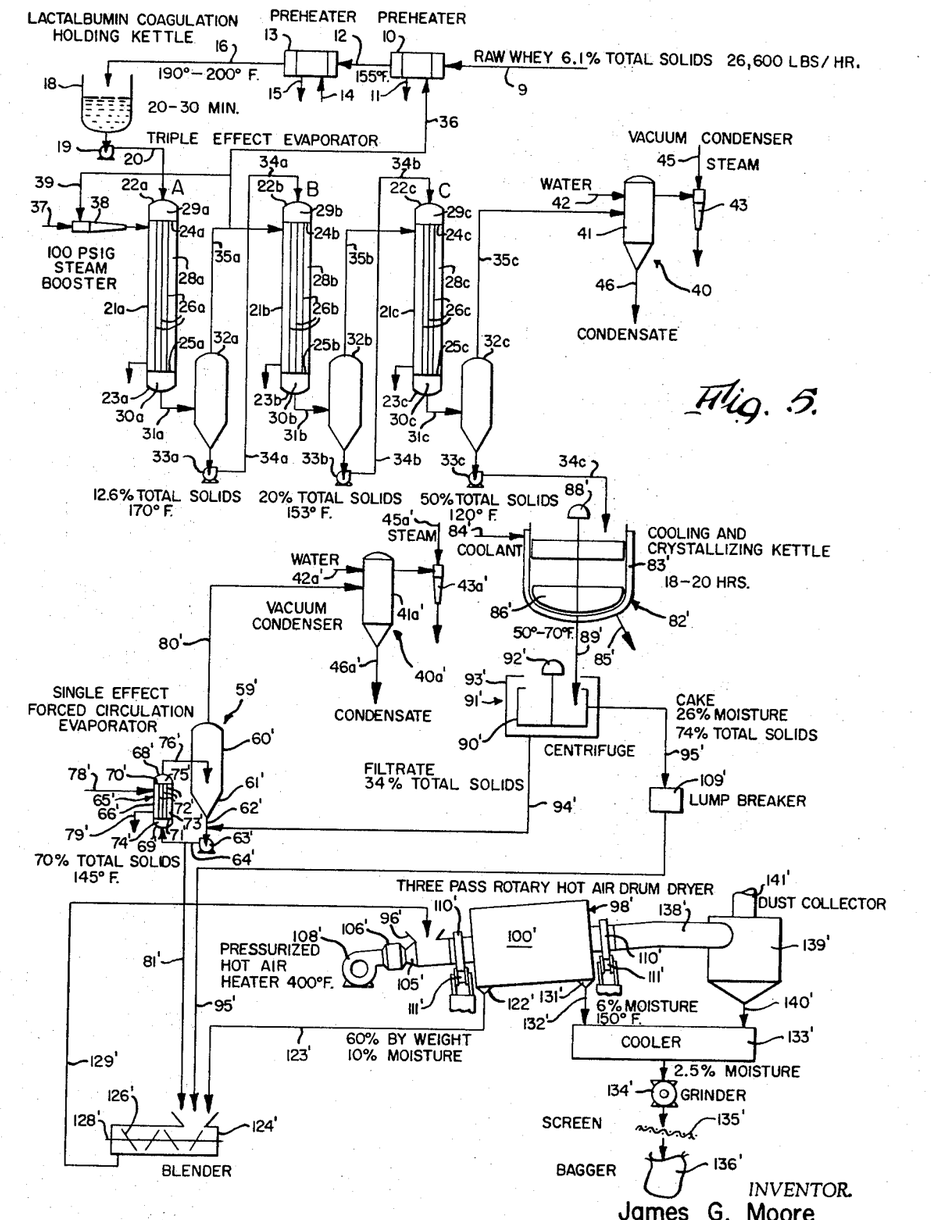
FIG. 5 is a view similar to FIG. 1 showing a modified form of the practice of the invention.

FIG. 5

This form of the invention is illustrated as having the same preheaters 10, 13, holding or lactalbumin coagulation kettle 18 and triple effect evaporator A, B, C, as in FIGS. 1–4 and hence the same reference numerals have been employed and the description will not be repeated. The concentrated whey, with its lactalbumin also discharges into a seeding and crystallizing kettle, but this is preferably of the type shown at 82 in FIGS. 1–4 and hence the same reference numerals have been employed in FIG. 5 and distinguished by a prime. The outlet 89' from this kettle feeds directly into the bowl 90' of a centrifuge 91' identical to the centrifuge 91 shown in FIGS. 1–4, and the filtrate from this centrifuge 91' is fed via line 94' to a forced circulation single effect evaporator 59' again similar to the evaportor 59 in FIGS. 1–4 so that similar parts are distinguished by a prime. The liquid from this single effect forced circulation evaporator is fed via a line 81' to a blender 124' similar to the blender 124 in FIGS. 1–4 and the filter cake from the centrifuge 91' is also fed via line 95' containing a lump breaker 109' into this blender 124'. The output from this blender is fed to the inlet hopper 96' of a three pass rotary hot air drum dryer 98', similar to the FIGS. 1–4 dryer 98, via a line 129', and a part of the partly dried material passing through this dryer 98' is withdrawn through the hopper 122' and recycled via line 123' to the blender 124'. The product output from the three pass rotary drum hot air dryer 98' is the same as in FIGS. 1–4 and the same reference numerals have therefore been employed and distinguished by a prime.

OPERATION FIG. 5

As an example of the operation of the form shown in FIG. 5, it will again be assumed that 26,600 pounds per hour of raw cottage cheese whey having a total solids content of 6.1% is to be converted into, without additives or pH modification, a dry granular product suitable for human consumption and containing all of the original protein lactose and mineral components, the product being non-gritty and nonhygroscopic and hence with the lactose predominately in the form of the alpha hydrate.

This raw cottage cheese whey is supplied from the feed line 9, to the first preheater 10 where purely for operational economy, its temperature is raised by a part of the vapors from the first effect A of the triple effect evaporator to a temperature of, say, 155° F. The so preheated whey is then passed via line 12 through the second perheater 13 where its temperature is raised, through steam supplied to this second preheater, to from about 190° F.– 200° F. At this temperature it is held, by recirculation, in the holding kettle 18 for from about 20–30 minutes to coagulate the lactaybumins, such coagulation being important to avoid subsequent coagulation thereof on the surfaces of the concentrator or other parts of the apparatus. After such coagulation, the whey from the coagulating holding kettle 18 is pumped by the pump 19 to the space 29a above the top tube sheet 24a of the first effect A of the multiple effect evaporator. In flowing down through the tubes 26a of this first effect A, it is subjected to the heat of the steam surrounding these tube and supplied from the steam inlet 37 and upon discharge of the whey from the lower chamber 30a into the vapor separator of flash chamber 32a evaporation takes place so as to concentrate the whey to about 12.6% total solids, the leaving temperature being about 170° F.

As previously indicated, for economy in operation, a part of the vapor generated in this first vapor separator 32a is employed to initially preheat the feed in the preheater 10. Another part is used as the source of heat for the second effect B and a third part is shown as returned to the steam booster 38 for the first effect A. The preconcentrated whey from the flash chamber 32a, together with its coagulated lactalbumin content, is withdrawn by the pump 33a at its temperature of about 170° F. and so preconcentrated to about 12.6% total solids and is fed to the space 29b above the tube sheet 24b of the second effect B. On flowing down the tubes 26b it is subjected to the heat of the vapors surrounding these tubes and on being discharged from the bottom chamber 30b into the vapor separator 32b it flashes to produce a concentrate of about 20% total solids, the leaving temperature being about 153° F.

The vapor produced in this flash chamber 32b serves to heat the third effect C and the preconcentrated whey from the flash chamber 32b, together with its coagulated lactalbumin content, is withdrawn by the pump 33b and discharged into the chamber 29c above the top tube sheet 24c of the third effect C. On flowing down the tubes 26c of this third effect C it is subjected to the heat of the vapors surrounding these tubes and on being discharged from the bottom chamber 30c into the vapor separator 32c it flashes to produce a concentrate at a temperature of 120° F. and having 50% total solids this flash chamber 32c being maintained under vacuum by the vacuum condenser 40.

The whey so preconcentrated to about 50% total solids and at a temperature of about 120° F., together with its lactalbumin content fully coagulated, is transferred by the pump 33c into the cooling and crystallizing kettle 82' where it is slowly agitated or kept in motion by the motor driven paddle 86' and is cooled to from about 50° to about 70° F. Without external seeding, the whey is held in this cooling and crystallizing kettle 82' approximately 18–20 hours. Crystallization of the lactose in the form of the alpha hydrate is initiated, crystallization in the form of the beta anhydride being inhibited because of the low temperature, namely 50°–70° F. maintained in this cooling and crystallizing kettle 82'. Also under such time and temperature condition, crystal growth also proceeds to produce crystals capable of being removed in a centrifuge, this being in contrast to the seeding and crystallizing kettle 50 in FIGS. 1–4 where such growth is not required.

Any crystallization in the triple effect evaporator, A, B, C in the form of the beta anhydride is inhibited due to maintaining all temperature in this triple effect evaporator and in the preheaters in advance of this triple effect evaporaor below the critical temperature of 200° F. Below this critical temperature lactose crystallizes essentially in the form of nonhygroscopic alpha hydrate, limited only by the physical equilibrium factors, whereas above this critical temperature crystallization is in the form of the hygroscopic beta anhydride.

The whey with its lactalbumin content coagulated and with its lactose in part in the form of large alpha hydrate crystals flows from the cooling and crystallizing kettle 82' into the rotating bowl 90' of the centrifuge 91'. The filter cake from the bowl 90' having approximately 74% total solids content or 26% moisture, and representing a recovery of about 59.5% of the toal solids in the whey fed to the centrifuge, is removed via line 95' and discharged through the lump breaker 109' into the blender 124'.

The filtrate from the centrifuge 91' flows via line 94' to the forced circulation single effect vacuum evaporator 59'. The steam heater 65' of this single effect evaporator raises the temperature of the whey to approximately 145° F. and upon being discharged at this temperaure into the vapor separator 60' it flashes to produce a concentrate of from about 70%–75% of total solids, a vacuum being maintained in the flash chamber 60' by the vacuum condenser 40a'.

The recirculating pump 63' for the forced circulation single effect evaporator 59' discharges a part of its output at this temperature of 145° F. and with about 70% total solids via line 81' into the blender 124'.

From the blender 124' the material is conveyed into the inlet hopper 96' of the three-pass rotary drum hot air dryer 98'. As with the form of the invention shown in FIGS. 1–4, the product is discharged into the cooler 133', grinder 134' and screen 135' into the bagger 136', the temperature and moisture content conditions being approximately the same. However, as with the form of FIGS 1–4, an important feature of the invention is in the recycling of a substantial amount of the solid whey to an earlier stage of the proces. The material so recycled escapes from the dryer 98' through the hopper 122' and line 123' and in amount is about 60% of the total weight of the fresh material fed to the dryer 98'. Thus, the weight of the partly dried material withdrawn through line 123' for recycling is about 60% of the total weight of the fresh material fed from the single effect evaporator 59' and centrifuge 91' via lines 81' and 95' to the dryer 98'. The line 123' discharges the solid partly dried whey into the blender 124' for such recycling with the fresh material from lines 81' and 95'.

Figure 6:
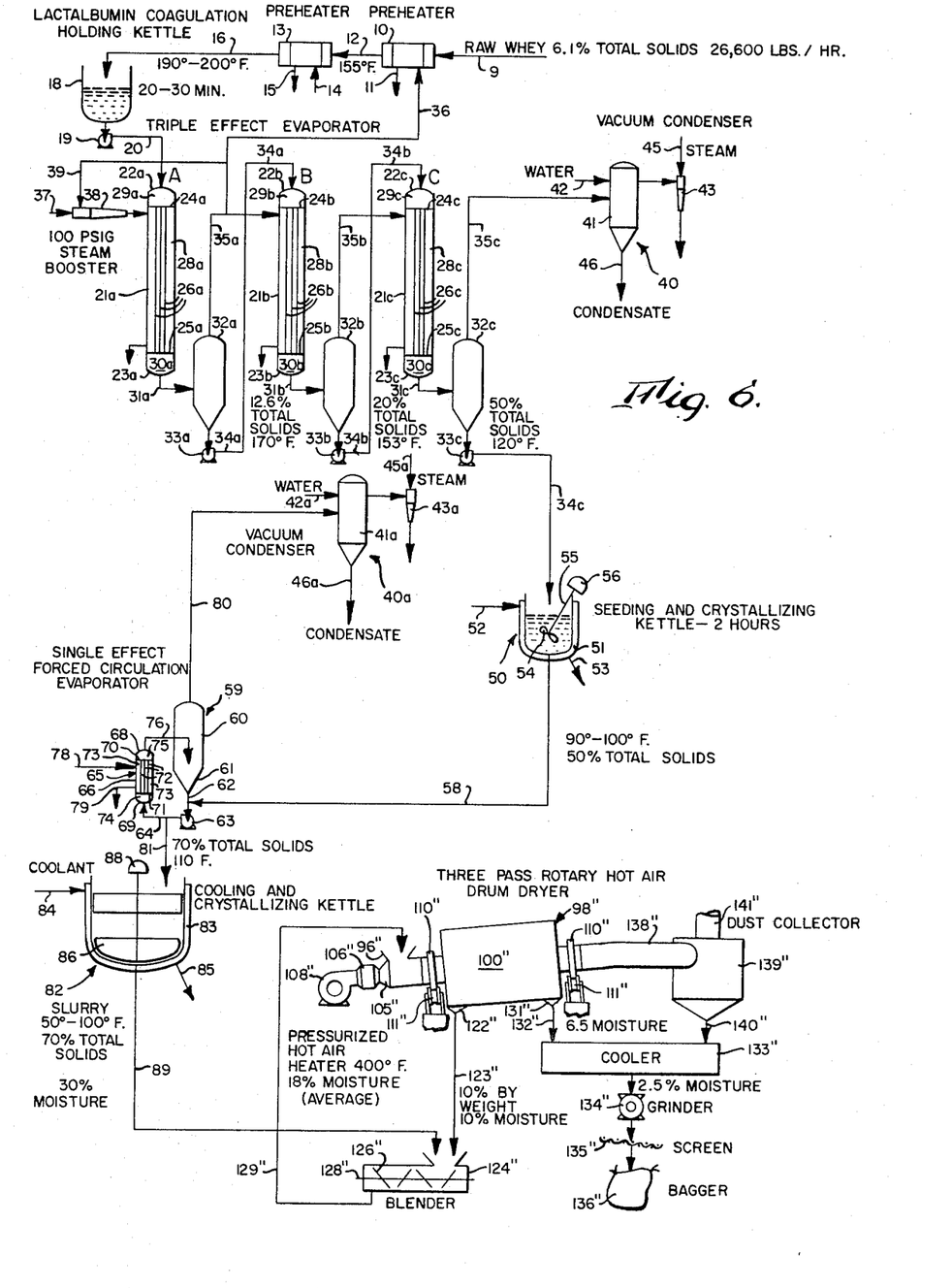
FIG. 6 is a view similar to FIG. 1 showing still a further modified form of the practice of the invention.

FIGURE 6

This form of the invention is illustrated as having the same preheaters 10, 13, holding or lactalbumin coagulation kettle 18, triple effect evaporator A, B, C, seeding or crystallizing kettle 50, forced circulation single effect evaporator 59, and cooling and crystallizing kettle 82 with its outlet 89, as in FIGS. 1–4 and hence the same reference numerals have been employed and the description will not be repeated. However, this outlet 89 feeds directly into the blender 124" similar to the blender 124 in FIGS. 1–4. From this blender the product in process is conveyed via line 129" directly into the inlet hopper 96" of a three-pass rotary drum hot air dryer 98" similar to the three-pass dryer 98 illustrated in detail in FIGS. 1–4, and a part of the partly dried material passing through this dryer is withdrawn through the hopper 122" and recycled via line 123" to the blender 124". The product output from the three-pass dryer 98" is the same as in FIGS. 1–4 and the same reference numerals have therefore been employed and distinguished by a double prime.

OPERATION FIG. 6

As an example of the operation of the form shown in FIG. 6, it will again be assumed that 26,600 pounds per hour of raw cottage cheese whey having a total solids content of 6.1% is to be converted, without additives or pH modification, into a dry granular product suitable for human consumption and containing all of the original protein, lactose and mineral components, the product being non-gritty and nonhygroscopic and hence with the lactose predominately in the form of the alpha hydrate.

This raw cottage cheese whey is supplied from the feed line 9, to the first preheater 10 where, purely for operational economy, its temperature is raised by a part of the vapors from the first effect A of the triple effect evaporator to a temperature of, say, 155° F. The so preheated whey is then passed via line 12 through the second preheater 13 where its temperature is raised, through steam supplied to this second preheater, to from about 190° F.–200° F. At this temperature it is held, by recirculation, in the holding kettle 18 for from about 20–30 minutes to coagulate the lactalbumins, such coagulation being important to avoid subsequent coagulation thereof on the surfaces of the concentrator or other parts of the apparatus. After such coagulation, the whey from the coagulating holding kettle 18 is pumped by the pump 19 to the space 29a above thes top tube sheet 24a of the first effect A of the multiple effect evaporator. In flowing down through the tubes 26a of this first effect A, it is subjected to the heat of the steam surrounding these tubes and supplied from the steam inlet 37 and upon discharge of the whey from the lower chamber 30a into the vapor separator or flash chamber 32a evaporation takes place so as to concentrate the whey to about 12.6% total solids, the leaving temperature being about 170° F.

As previously indicated, for economy in operation, a part of the vapor generated in this first vapor separator 32a is employed to initially preheat the feed in the preheater 10. Another part is used as the source of heat for the second effect B and a third part is shown as returned to the steam booster 38 for the first effect A. The preconcentrated whey from the flash chamber 32a, together with its coagulated lactalbumin content, is withdrawn by the pump 33a at its temperature of 170° F. and so preconcentrated to about 12.6% total solids and is fed to the space 29b above the tube sheet 24b of the second effect B. On flowing down the tubes 26b it is subjected to the heat of the vapors surrounding these tubes and on being discharged from the bottom chamber 30b into the vapor separator 32b it flashes to produce a concentrate of about 20% total solids, the leaving temperature being about 153° F.

The vapor produced in this flash chamber 32b serves to heat the third effect C and the preconcentrated whey from the flash chamber 32b, together with its coagulated lactalbumin content, is withdrawn by the pump 33b and discharged into the chamber 29c above the top tube sheet 24c of the third effect C. On flowing down the tubes 26c of this third effect C it is subjected to the heat of the vapors surrounding these tubes and on being discharged from the bottom chamber 30c into the vapor separator 32c it flashes to produce a concentrate at a temperature of about 120° F. and having about 50% total solids, this flash chamber 32c being maintained under vacuum by the vacuum condenser 40.

The whey so preconcentrated to about 50% total solids and at a temperature of about 120° F., together with its lactalbumin content fully coagulated, is transferred by the pump 33c into the seeding and crystallizing kettle 50 where it is slowly agitated or kept in motion by the motor driven propeller 54 and is cooled to from about 90° F. to about 100° F. Without external seeding, the whey is held in this seeding and crystallizing kettle 50 approximately two hours. Crystallization of the lactose in the form of the alpha hydrate is initiated, crystallization in the form of the beta anhydride being inhibited because of the low temperature, namely, 90° F.–100° F. maintained in this seeding and crystallizing kettle 50.

The holding time in the seeding and crystallizing kettle 50 can be very materially reduced if alpha hydrate seed crystals are added to the kettle instead of relying on self-seeding as immediately above described. With such external seeding, the holding time in the kettle 50, with the same cooling to from about 90° to about 100° F. can be reduced to about 20 minutes.

Any crystallization in the triple effect evaporator, A, B, C in the form of the beta anhydride is inhibited due to maintaining all temperature in this triple effect evaporator and in the preheaters in advance of this triple effect evaporator below the critical temperature of 200° F. Below this critical temperature lactose crystallizes essentially in the form of non-hygroscopic alpha hydrate, limited only by the physical equilibrium factors, whereas above this critical temperature of crystallization is in the form of the hygroscopic beta anhydride.

The whey with its lactalbumin content coagulated and with its lactose in part in the form of alpha hydrate crystals flows from the seeding and crystallizing kettle 50 to the forced circulation single effect vacuum evaporator 59. The steam heater 65 of this single effect evaporator raises the temperature of the whey to approximately 110° F. and upon being discharged at this temperature into the vapor separator 60 it flashes to produce a concentrate of about 70% total solids, a vacuum being maintained in this flash chamber 60 by the vacuum condenser 40a.

The recirculating pump 63 for the forced circulation single effect evaporator 59 discharges a part of its output at this temperature of about 110° F. and with about 70% total solids into the cooling and crystallizing kettle 82 where the whey is maintained in motion by the motor driven paddle 86. In this cooling and crystallizing kettle the whey is cooled from about 110° F. to from about 50° F. to about 100° F. by a coolant introduced into its jacket space 83 and it is maintained in this cooling and crystallizing kettle for from 18–20 hours so that the lactose continues its crystallization, particularly in crystal size growth, in the form of the alpha hydrate due to the low temperature and length of the time to which it is subjected in this cooling and crystallizing kettle 82.

From this cooling and crystallizing kettle 82 the whey is conducted via the line 89 directly to the blender 124″.

From the blender 124″ the material is conveyed via line 129″ into the inlet hopper 96″ of the three-pass rotary drum hot air dryer 98″. As with the form of the invention shown in FIGS. 1–4, the product is discharged into the cooler 133″, grinder 134″ and screen 135″ into the bagger 136″, the temperature and moisture content conditions being approximately the same. However, as with the form of FIGS. 1–4, an important feature of the invention is that at the end of the second pass through the three stage rotary drum hot air dryer 98″ a substantial amount of partly dried whey is withdrawn at 122″ and 123″ and recycled to an earlier stage of the process. The material so recycled in amount is about 100% of the total weight of the fresh material fed to the drum dryer 98″. Thus the weight of the partly dried material recycled to the blender 124″ from the line 123″ about equals the weight of the fresh material fed to this blender via the line 89.

With the economy of the various forms of the present process in producing high quality, commercially nonhygroscopic dry whole whey without additives or pH modification, in free flowing, non-gritty granular form from acid or cottage cheese whey, a low cost highly nutritive product is provided having the many unique properties previously enumerated, from a present waste which is disagreeable and highly destructive to life by its present method of disposal.

We claim:

1. In a process for drying whey, including the steps of reducing the water content of the whey by a first heating under vacuum at a temperature below about 200° F. to inhibit initial crystallization of the lactose content in the form of the hygroscopic beta anhydride, thereafter cooling the preconcentrated whey to such temperature and for such period of time to crystallize lactose therefrom predominately in the form of the nonhygroscopic alpha hydrate, thereafter further reducing the water content by a second heating under vacuum at a temperature below about 200° F. to inhibit further crystallization thereof in the form of the hygroscopic beta anhydride, recooling the whey following said second heating under vacuum to such temperature and for such length of time to promote crystal growth of the lactose predominately in the form of the non-hygroscopic alpha hydrate, and centrifuging the recooled whey, the improvement comprising: introducing filtrate and filter cake resulting from said centrifuging into a drying zone; contacting the filtrate and cake in the drying zone with a stream of hot drying gas to effect drying at a temperature below 200° F. and provide a dry solid material containing substantially all of the lactose, lactalbumin, inorganic mineral and fat content of the original whey; removing a partially dried portion of the solid material containing about 10% moisture, by weight, from an intermediate portion of the drying zone; and combining said partially dried material with the filtrate and filter cake being introduced into the drying zone in an amount that comprises at least about 50%, by weight, of the filtrate and filter cake being introduced into the drying zone.

2. In a process for drying whey, including the steps of reducing the water content of the wehy by a first heating under vacuum at a temperature below about 200° F. to inhibit initial crystallization of the lactose content in the form of the hygroscopic beta anhydride, thereafter cooling the preconcentrated whey to such temperature and for such period of time to crystallize lactose therefrom predominately in the form of the nonhygroscopic alpha hydrate, centrifuging the precooled concentrated whey thereafter, further reducing the water content of the filtrate from the centrifuging by a second heating under vacuum at a temperature below about 200° F. to inhibit further crystallization thereof in the form of the hygroscopic beta anhydride, the improvement comprising: combining filter cake from the centrifuging and concentrate from the second heating under vacuum to provide a combined stream; introducing the combined stream into a drying zone; contacting the combined stream in the drying zone with a stream of hot drying gas to effect drying at a temperature below 200° F. and provide a dry solid product containing substantially all of the lactose, lactalbumin, inorganic mineral and fat content of the original whey; removing a partially dried portion of the solid product containing about 10% moisture, by weight, from an intermediate portion of the drying zone; and combining said partially dried solid product with the combined stream being introduced into the drying zone in an amount that comprises at least 50%, by weight, of the combined stream being introduced into the drying zone.

3. In a process for drying whey, including the steps of reducing the water content of the whey by a first heating under vacuum at a temperature below about 200° F. to inhibit initial crystallization of the lactose content in the form of the hygroscopic beta anhydride, thereafter cooling the preconcentrated whey to such temperature and for such period of time to crystallize lactose therefrom predominately in the form of the nonhygroscopic alpha hydrate, thereafter further reducing the water content by a second heating under vacuum at a temperature below about 200° F. to inhibit further crystallization thereof in the form of the hygroscopic beta anhydride, recooling the whey after said second heating under vacuum to such temperature and for such length of time to promote crystal growth of the lactose predominately in the form of the nonhygroscopic alpha hydrate, the improvement comprising: introducing the recooled whey into a drying zone; contacting recooled whey in the drying zone with a stream of hot drying gas to effect drying at a temperature below 200° F. and provide a dry solid material containing substantially all of the lactose, lactalbumin, inorganic mineral and fat content of the original whey; removing a partially dried portion of the solid material containing about 10% moisture, by weight, from an intermediate portion of the drying zone; and combining said partially dried material with the recooled whey being introduced into the drying zone in an amount that comprises at least about 50%, by weight, of the recooled whey being introduced into the drying zone.

4. The process as defined in claim 3 wherein the partially dried material comprises about 100%, by weight, of the recooled whey being introduced into the drying zone.

(References on following page)

References Cited

UNITED STATES PATENTS

| | | | |
|---|---|---|---|
| 2,118,252 | 5/1938 | Kraft | 99—57 |
| 2,181,146 | 11/1939 | Peebles et al. | 99—57 |
| 2,627,463 | 2/1953 | Meade | 99—57 |
| 3,447,930 | 6/1969 | Francis | 99—57 |

OTHER REFERENCES

Hall et al.: Drying Milk and Milk Products, The Avi Publ. Co. Inc., Westport, Conn., 1966, pp. 172 and 173.

LIONEL M. SHAPIRO, Primary Examiner

D. M. NAFF, Assistant Examiner